Figure 1:
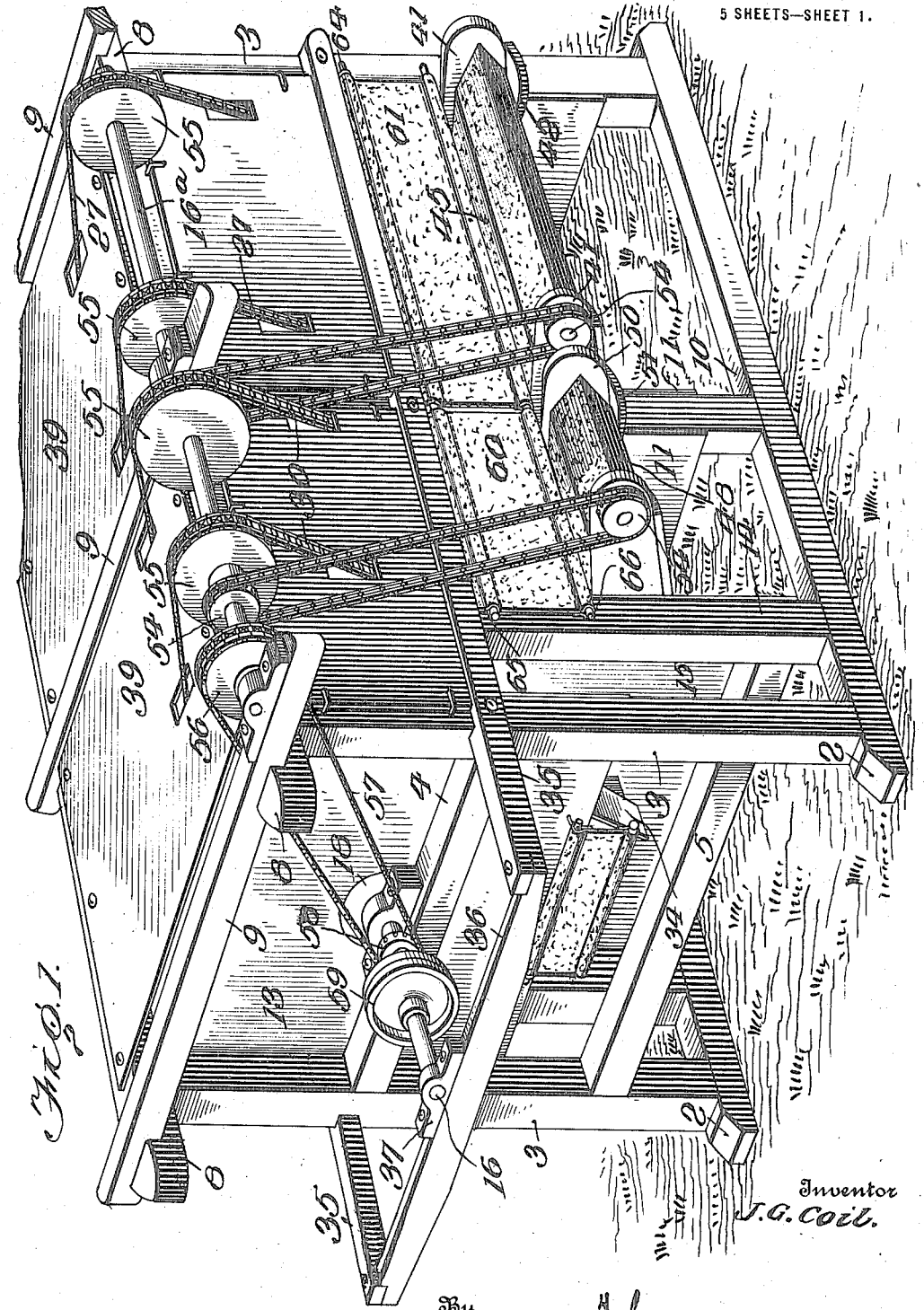

J. G. COIL.
GREEN PEA HULLING MACHINE.
APPLICATION FILED DEC. 1, 1915.

1,202,486.

Patented Oct. 24, 1916.
5 SHEETS—SHEET 4.

Inventor
J. G. Coil.

By _____, Attorneys

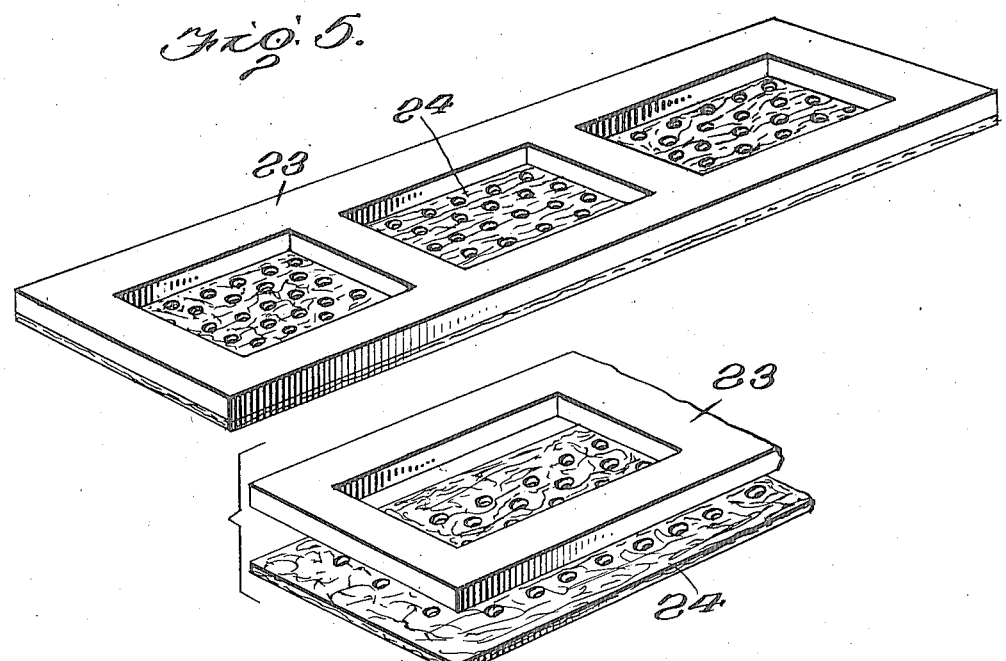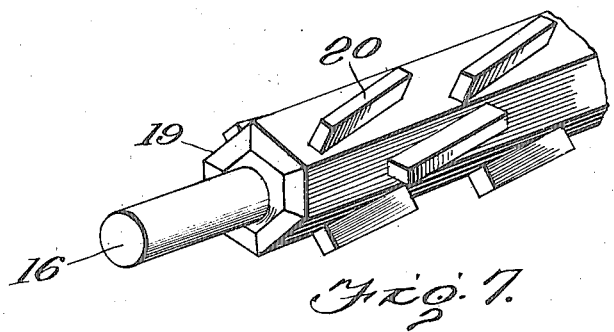

UNITED STATES PATENT OFFICE.

JAMES G. COIL, OF CADIZ, OHIO.

GREEN-PEA-HULLING MACHINE.

1,202,486. Specification of Letters Patent. Patented Oct. 24, 1916.

Application filed December 1, 1915. Serial No. 64,541.

*To all whom it may concern:*

Be it known that I, JAMES G. COIL, a citizen of the United States, residing at Cadiz, in the county of Harrison and State of Ohio, have invented certain new and useful Improvements in Green-Pea-Hulling Machines, of which the following is a specification.

My invention relates to machinery for hulling green peas on the vines, and particularly to that class of hulling machinery wherein the vines containing peas within the pods are treated within a rotary cylinder and there submitted to the action of certain beaters to break the pods and separate the peas from the pods and vines, the pods and vines being discharged separately from the peas.

The trouble with all machines designed to thresh green peas from the green vines, is that while they shell or hull the peas, they do not separate all of the peas from the vines, but allow a large quantity of the crop to pass into and through the machine and into the straw stack or silo, this being a constant loss both to the grower and to the factory or other user.

Machines designed for the purpose of shelling green peas on the vine are now formed with one cylinder which surrounds a rapidly rotating shaft or drum provided with beaters, these beaters being set helically so as to carry the pea vines from the inlet end of the cylinder to and through the discharge end thereof. The cylinder acts to carry the vines upward and then drop the bundles of vines upon the revolving beaters, the impact of the beaters causing the breaking of the pods and the discharge of the peas. Two things are necessary for the proper shelling of these green peas, first the breaking of the pea pods and second the tearing apart of the vines. I have found in practice that these two factors of success are to a degree antagonistic, and that it is impossible with one drum to secure both a proper disentanglement of the vines and a proper beating action on the pea pods. If the cylinder is so constructed and is of such size as to fully beat the vines so as to break the pods, it is not properly constructed to disentangle the vines so as to permit the loose peas imprisoned and entangled with the vines to escape and be discharged from the machine. Furthermore, the cylinder in which the vines are beaten to break the pods should be so formed that the vines will be thrown forward horizontally by the action of the beating blades or impact boards so as to cause a constant feed of the bundles or bunches of vines instead of the vines being merely tossed upward and falling back into the lower portion of the beating cylinder and thereby accumulating in the lower portion of the cylinder until the lower portion is so full of vines that the beaters merely act to crush the vines and thereby crush and bruise the peas contained within the pods.

One object of my invention is to provide a machine of the character described, so constructed as to thoroughly beat and tear apart the vines as they pass through the machine so as to release the loose peas that are entangled in the vines to benefit both the grower and the user.

A further object is to so construct the machine that a small quantity of the vines will be dropped upon the beaters so that the beaters will have a better chance to properly impact upon the pods, and further so that the vines will be fed through the machine at a more rapid rate.

A still further object is to so construct the machine that the pea vines will be given a preliminary beating in a primary cylinder to break the pods and discharge as many of the peas as possible, and that then the vines shall be carried to a secondary beating cylinder of larger diameter than the primary cylinder wherein the vines are torn apart, disentangled and separated so as to release the loose peas that may be caught in the vines.

A still further object in this connection is to so construct the secondary cylinder that the vines shall be tossed through the air for a considerable space at each impact of the beater boards or blades so as to permit the loose peas entangled in the veins to fall therefrom and drop to the bottom of the cylinder.

A further object in this connection is to provide a chute disposed between the primary and secondary cylinders over which the vines pass as they are driven from the primary cylinder into the secondary cylinder. Loose peas which may be imprisoned in the vines at this point drop upon the chute and are carried into the secondary cylinder and discharged therefrom through the perforations in the periphery thereof.

A still further object is to so construct the primary and secondary cylinders that they will prevent any crushing or dragging of the vines against the impact beaters, and so construct them that they will carry the vines up in relatively small bundles or bunches, thus causing the bundles to be fed more rapidly through the cylinders than if the vines were acted on in large bundles or bunches.

A further object of my invention is to improve the construction of the pea separating screens disposed on the peripheries of the cylinders and so form them that they will not gather dirt as rapidly as the screens ordinarily used, will last longer and therefore be cheaper, may be easily cleaned, and will not harden under the action of the pea juice.

A further object is to provide for each cylinder compartment, a circular roof or housing whereby to render the machine sanitary, and eliminate the accumulation of dirt, filth and vegetable matter in corners, niches and recesses of the housing and permit the machine to be more easily kept clean and thus minimize the danger of flying peas sticking to the housing, becoming sour and then dropping downward and being carried off with the good peas to afterward infect the good peas in the cans in which the sour peas may happen to lodge.

Other objects will appear in the course of the following description.

Figure 2:
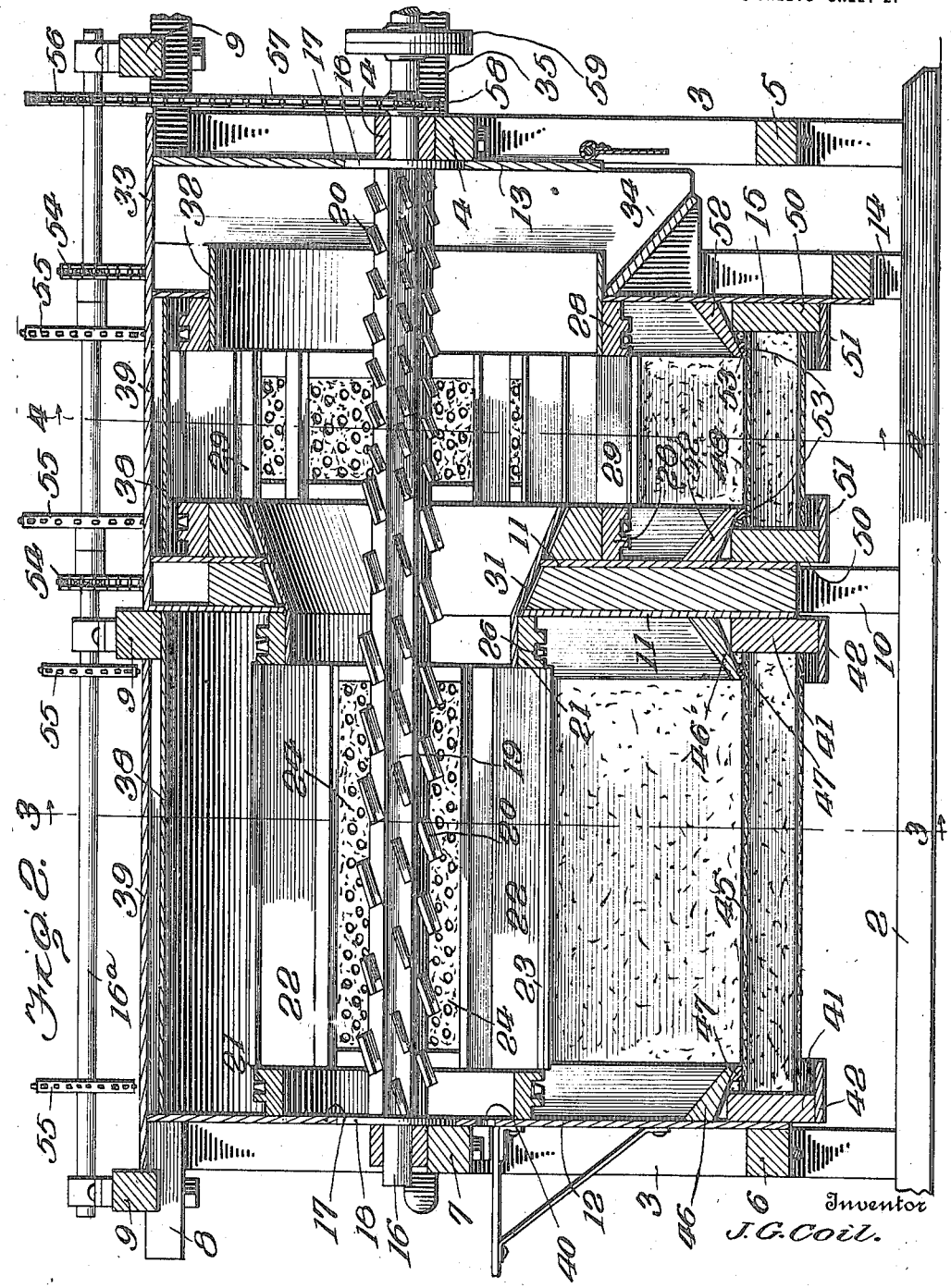
Figure 3:
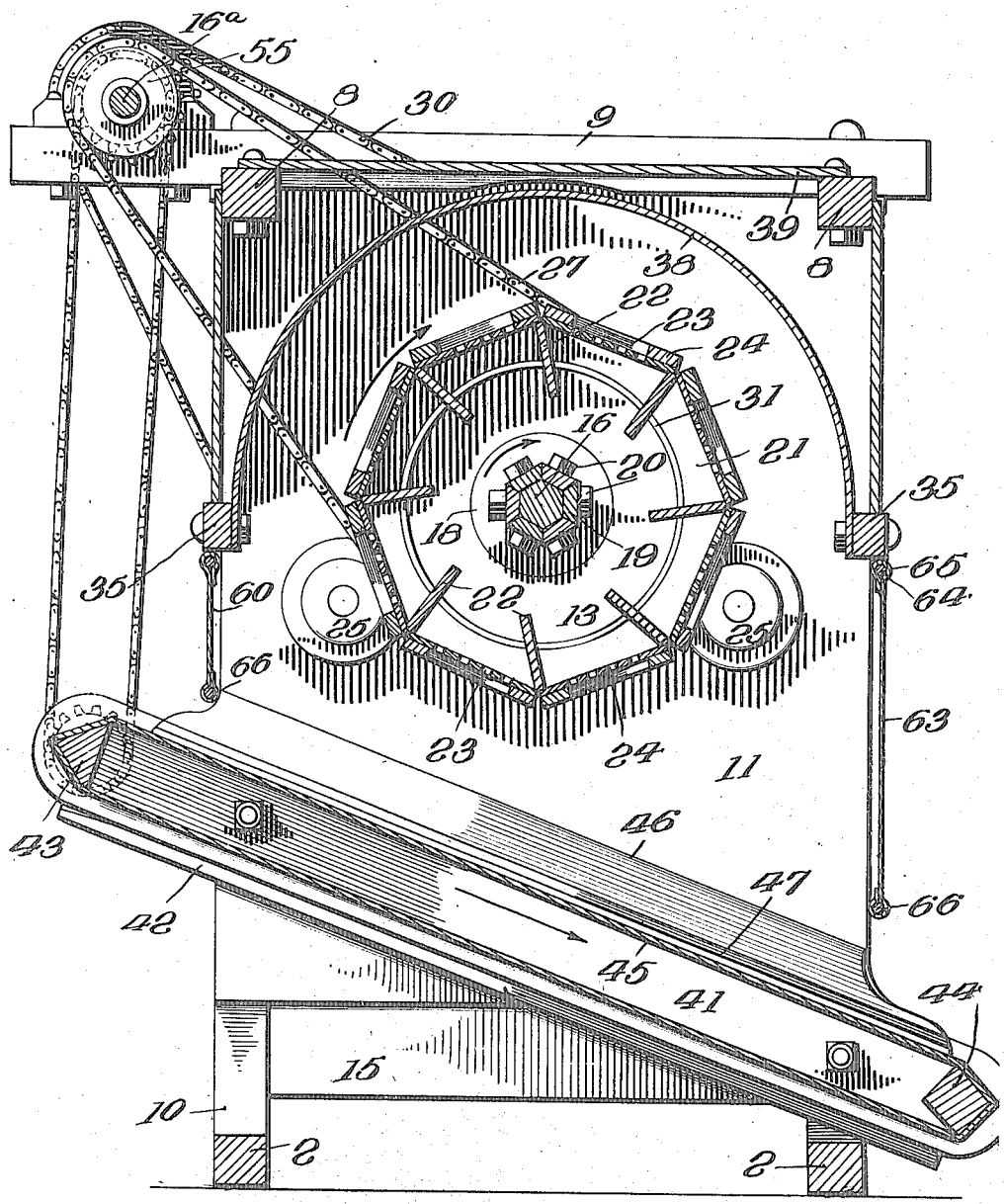
Figure 4:
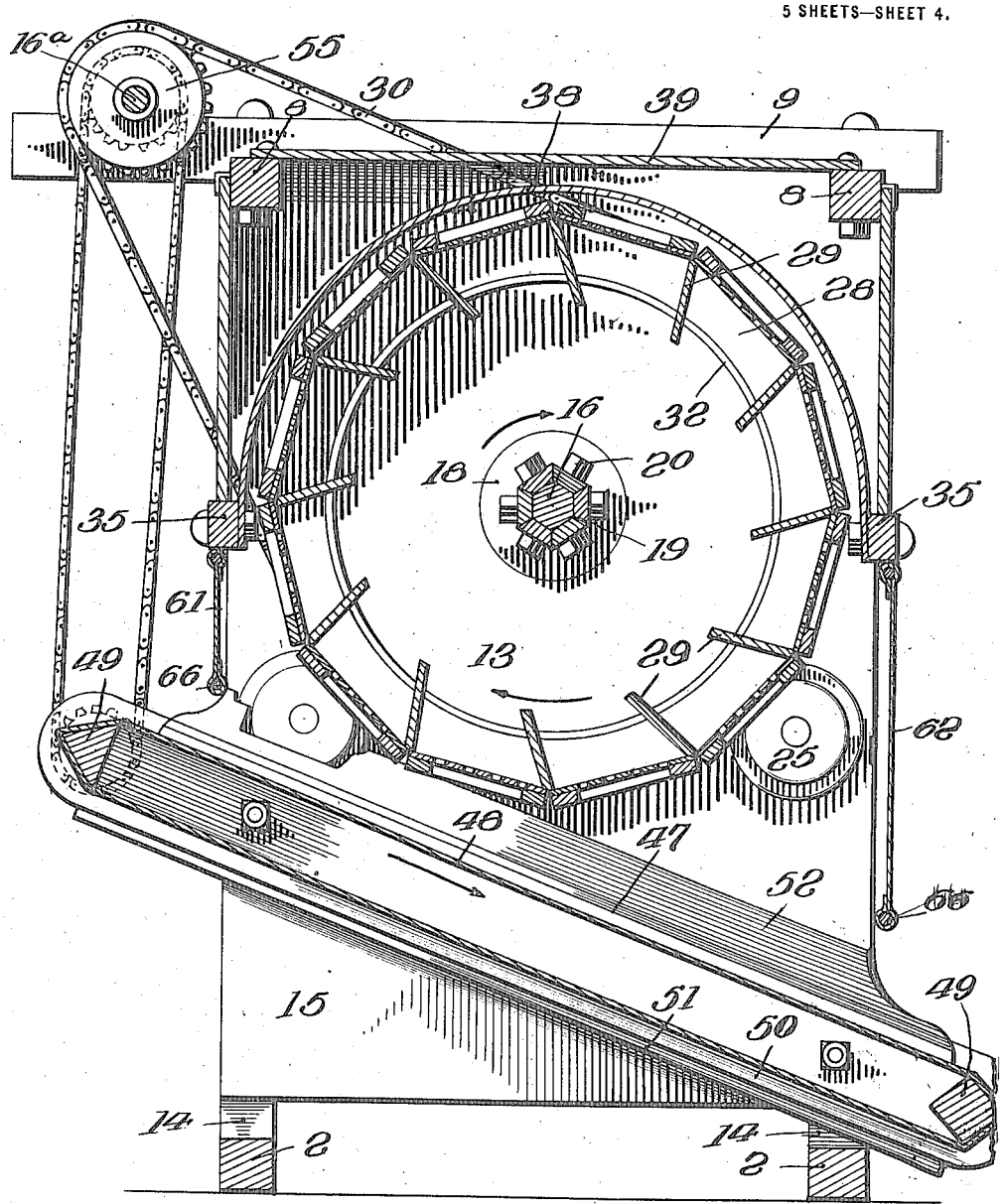

My invention is illustrated in the accompanying drawings wherein:

Figure 1 is a perspective view of a pea hulling machine constructed in accordance with my invention. Fig. 2 is a longitudinal axial section through the machine. Fig. 3 is a transverse section on the line 3—3 of Fig. 2. Fig. 4 is a transverse section on the line 4—4 of Fig. 2. Fig. 5 is a perspective view of one of the screen frames with the screens in position. Fig. 6 is a view of a portion of one of the screen frames with the rawhide screen detached. Fig. 7 is a fragmentary perspective of the heating drum and shaft.

Corresponding and like parts are referred to in the following description and indicated in all the views of the accompanying drawings by the same reference characters.

In these drawings, 2 designates opposed parallel base sills of any ordinary or usual form having approximately the length of the machine. Extending upward from these sills are the corner posts 3 which are four in number, the corner posts at one end of the machine being joined together by cross bars 4 and 5 and at the other end thereof by the cross bars 6 and 7. Extending longitudinally between the corner posts are the beams 8, these beams being connected to each other at their ends by transverse beams 9.

Disposed intermediate the ends of the sills 2 are the uprights 10, and attached to these uprights are the transverse partition plates or boards 11. Attached to the inside faces of the end beams 3 at opposite ends of the machine are the end boards 12 and 13. Disposed inward of the end board 13 are the upwardly extending posts 14, and attached to the inside faces of these posts is the partition 15 which may be made of any suitable material.

It will be seen that the space bounded at one end by the end board 12 and at the other end by the partition member 15 is divided by the partitions 11 into two compartments, one of these compartments being larger than the other and designed for the purpose of containing the primary beating or threshing cylinder while the other or smaller compartment is designed to contain the secondary beating or threshing cylinder. It will be noted that a space is left between the two partitions 11 which are disposed on both sides of the posts 10. The partitions 11 are each formed with a central opening as is the partition 15, the purpose of which will hereafter appear.

Mounted at one end in a bearing on the cross piece 4 and at the other end in a bearing on the cross piece 7 is a longitudinally extending shaft 16. The end pieces 12 and 13 are cut away, as at 17, concentrically to this shaft, and mounted upon the shaft in alinement with these partitions are the disks 18 which fill these cutaway portions. The shaft 16 extends longitudinally throughout the length of the machine and that portion of the shaft between the end bearings is many-sided in section to form a drum, this many-sided portion of the shaft being provided with outwardly projecting beating or impact blades.

Preferably longitudinally extending boards or planks called beater board planks and designated 19 are bolted or otherwise attached to the shaft 16 and are arranged in a rectangular relation so as to provide a many-sided drum. Bolted or otherwise attached to the beater board planks are the blades or "beater boards" 20. As seen in Fig. 2, these blades or beater boards are arranged at an angle to the axis of the shaft so that as the shaft revolves these beater boards or blades will act to feed material coming in contact therewith forward through the machine.

It will be understood that the path of the vines through this machine is helical, the bundles of vines being carried around the beater carrying drum, repeatedly dropped upon the drum, and repeatedly struck by the beaters while passing along this helical path. It will be seen also that the series of beater boards or blades which are arranged on one face of the shaft or drum 16 are in staggered relation to the blades arranged on the next adjacent face. It is also to be noted that the impact or beater blades which are in the secondary compartment or surrounded by the secondary cylinder as will hereafter appear, are smaller than those blades which are surrounded by the primary cylinder.

Mounted between the end board 12 and the adjacent intermediate partition 11 and disposed concentrically to the central shaft 16 is a primary beating cylinder composed of the oppositely disposed wheels or rings 21 and the longitudinally extending approximately radial ties or elevating ribs 22. In the construction illustrated in the drawing and in ordinary use, these wheels 21 will be about five feet in diameter. It will be noted that the ties or ribs 22 extend inward beyond the inner circumference of these wheels, that they are set relatively close together and that they are set slightly tangential to the center of rotation.

The outer edges of the ties are beveled and resting against these beveled edges are the frames 23 designed to support the screens 24. These screens are preferably made of rawhide and are perforated to permit the passage of the shelled peas, these perforations being, of course, of a size a little larger than the peas so that the peas may readily escape therethrough. Preferably these screens are made of rawhide as I have found in practice that rawhide screens have many advantages over metallic screens or screens of other material, such as rubber. They are more readily cleaned, they are not affected by the pea juice and they will wear much longer than ordinary screens. Preferably the frames 23 are formed with three openings so as to support each screen intermediate its ends. The screens may be attached to the frames in any desired way and the frames are in turn attached to the ribs in any desired manner.

The end wheels are rotatably mounted upon rollers 25. Each of these rollers is rotatably supported upon the adjacent partition and each roller has a peripheral portion which contacts with the rim of the adjacent wheel and an annular base flange which extends into the space between the rim of the wheel and the partition. Each wheel is formed with a sprocket groove 26 for engagement by a sprocket chain 27, these sprocket chains running to a power shaft as will be later stated.

Mounted between the partition 15 and the adjacent partition 11 is a beater cylinder composed of the oppositely disposed parallel wheels 28. These wheels are constructed precisely the same as the wheels of the cylinder heretofore described, except that the cylinder is larger in diameter and the wheels 28 are set closer together. These wheels are also connected by ties or elevating ribs 29, these ties being set relatively close together and extending tangentially inward toward the central shaft a distance greater than the thickness of the wheeled rim to which the ties are attached. The wheel rims are grooved for engagement with driving sprocket chains in the same manner as are the wheels of the cylinder previously described, these chains running to a driving shaft. These chains are designated 30.

It is to be particularly noted at this point that the primary cylinder is much smaller in diameter than the secondary cylinder. If the primary cylinder is say five feet in diameter, the secondary cylinder should be eight feet in diameter and only about half as long as the primary cylinder.

Attached to the inner face of one of the wheels of the primary cylinder and projecting through the central opening formed in the partitions 11 is an annular chute 31. This chute is outwardly flaring, the opening in one of the partitions being larger than the opening in the other partition for the purpose of accommodating the flaring contour of the chute, and revolves with the primary cylinder and projects very slightly into the secondary cylinder so that bundles of vines discharged from the primary cylinder will pass over the smooth surface of the chute and be dropped into the secondary cylinder.

Attached to the inside face of the outermost wheel of the pair which forms the secondary cylinder is a ring or chute 32 which projects through the partition 15. Disposed between the adjacent uprights 3 and the posts 14 and extending between the end wall 13 and the partition 15 is a housing 33. This housing extends downward on each side of the central opening through the partition 15 and is contracted at its lower portion so as to form a spout 34 extending downward and outward for the discharge of the pea vines after they have been treated. The chute 32 projects into this spout so that the vines are carried clear into the spout and thus prevented from becoming caught or entangled in their discharge. If this chute 32 did not rotate with the cylinder, it would tend to entangle the vines and wind the vines up on the beater shaft.

Extending longitudinally along the outside faces of the posts are the auxiliary beams 35. These beams project at one end beyond the corner posts and carry a cross piece 36 upon which a bearing 37 is supported which journals the extremity of the central shaft. These longitudinal beams 35 not only act to support the end of the shaft and to brace the several uprights which form the frame of the machine, but they also support the housings 38. One of these housings 38 extends upward from one of the beams 35 to which it is attached in any suitable manner and extends over the primary wheel and then downward to the opposite beam 35, this housing being curved concentric to the primary cylinder so as to present a curved surface upon which dirt, dust and vegetable matter will not be likely to collect and which may be readily cleansed whenever desired. A housing 38 of the same character as previously described extends over the secondary cylinder and is attached at its ends to the longitudinal beams 35. Both of these housings are slotted at one side for the passage of the sprocket chains 27 and 30 whereby the cylinders are driven.

The top of the casing is closed in by means of roofing pieces 39 which are attached to the upper longitudinal beams in any suitable manner and which are slotted for the passage of the upper flights of the driving sprocket chains.

Disposed immediately below the transverse brace or beam 7 and cut through the end wall 12 is an inlet or feeding opening designated 40. This opening is nearly coincident with the inner circumference of the adjacent wheel 21 forming part of the primary cylinder so that material fed into this opening will be engaged by the beater boards or blades of the beater drum, thrown against the ties of the primary cylinder, and carried upward into a position to be again dropped upon the beater boards or blades attached to the shaft.

Attached to the inner faces of the partition 11 and end board 12 are the conveyer supporting frame beams 41. These extend downward at an angle and have inwardly projecting flanges 42. Mounted upon the upper ends of the frame beams 41 is a many sided roller 43. This roller is preferably triangular in form though not necessarily so. Mounted at the lower ends of the beams 41 is a many sided roller 44 which is illustrated as square in section and passing over these upper and lower rollers is a conveyer web 45 preferably of canvas or any like material. Inasmuch as the rollers 43 and 44 are many sided they will give a jerky or shaky motion to this web.

Disposed against the partition 11 and end board 12 and extending over the frame beams 41 and the marginal edges of the conveyer web 45 are the strips 46. These strips preferably carry rubber strips 47 along their edges which contact with the face of the web 45 so as to prevent the shelled peas and dirt from entering the inside of the web forming the conveyer.

Disposed below the secondary cylinder is a conveyer 48 mounted at its upper and lower ends on many sided rollers 49 which in turn are mounted on downwardly inclined frame beams 50 having inwardly directed flanges 51. Attached to the partitions 15 and 11 are the strips 52 which are formed each with a rubber member 53 bearing against the margin of the web. In other words, this conveyer is precisely similar to the conveyer previously described. The shaft of each of these conveyers is provided with a sprocket wheel 54 whereby power may be transmitted to the conveyer belts.

Mounted in journal bearings upon the transverse beams 9 is a counter shaft 16ª which may be driven in any suitable manner and carries upon it the several pairs of sprocket wheels whereby the primary and secondary cylinders and the conveyer belts may be driven. The sprocket wheels designated 54 are for the purpose of driving the conveyer belts while the sprocket wheels 55 carry upon them the sprocket chains which pass around the drums or cylinders as heretofore described and drive the same. Also mounted upon this countershaft 16ª is a sprocket wheel 56 over which a sprocket chain 57 passes to and around a sprocket wheel 58 on the main shaft. Mounted on the main shaft is a drive pulley 59 driven by a belt either from an engine or a countershaft and furnishing power for driving the entire machine. Means may also be provided upon this countershaft for driving a straw carrier extending from beneath the lower end of the discharge spout, this straw carrier not, however, being an essential part of my invention and, being of any ordinary or desirable construction, is therefore not illustrated or described.

Disposed in any suitable manner just below the rail or beam 35 on one side of the frame of the machine are the curtains 60 and 61 which are so supported as to depend over and close the openings between the rail 35 and the upper runs of the conveyer belts or webs.

Disposed upon the other side of the machine and likewise supported just below the adjacent longitudinal beam or rail 35 are the curtains 62 and 63 which hang down so that their lower ends rest against the supporting frames of the conveyers at the lower ends thereof and close the space above the conveyers. These curtains may be constructed in any suitable manner but as illustrated are supported by rods 64 at their upper ends which pass through eyes 65, the curtains being weighted by transverse rods 66 at their lower ends. It will be obvious that these curtains may be readily lifted if it is desired to get at the mechanism inclosed within the casing and that under ordinary circumstances they hang down and prevent the discharge of dust and trash and peas except by way of the conveyers.

It will be noted from the drawings that the ties or ribs are not exactly radial but that they are set somewhat tangentially to the central shaft or drum so that revolving as they do in one direction, they will carry the bundles of pea vines farther above the center of the main shaft than they would do if radially arranged as usual, the angular position of the ties or ribs preventing a discharge of the material to the beating drum until the material reaches a relatively high position above the same so that the bundles will strike against the forwardly moving blades as they drop from the cross ties or ribs onto the beating drum.

The operation of this machine is as follows: The pea vines are fed through the feed opening 40 into the primary cylinder and are engaged by the ties or ribs 22 therein. The primary cylinder rotates in the direction of the arrow, Fig. 3, and has the same direction of rotation as the beater drum or shaft with the beater blades 20, running at a much slower speed. The bundles of vines are carried upward by the ties or ribs 22 until they arrive at such point that the masses of vines will slip from these ties or ribs and fall upon the beaters 20 which will be at a position almost over the blades. The blades are rotating at a relatively high speed and, as a consequence, will strike the mass of vines with relatively great force and will sling the vines tangentially outward toward the front of the cylinder where they will lodge against the screen and in the compartment formed between two ties or ribs. The vines will then be carried around again, first downward beneath the rotating beater, then upward and again discharged upon the beater. As the blades 20 are set at an angle, the bundle or mass of vines will be advanced upon each projection caused by the impact of the beater blades so that eventually any one mass or bundle of vines will have traveled entirely through the primary cylinder and will be discharged upon the chute or "tire" 31. The impact of the beater blades upon the vines will act to break the pods, as before explained, and the peas will escape and find their way out through the perforations of the primary cylinder.

There is a very important function secured by the fact that the ties or ribs 22 are arranged tangentially with respect to the axis of rotation. In the ordinary pea hulling machine where these ribs or ties are radial, the vines are not carried up as high as they are in my machine. As a consequence, the vines drop downward and even escape contact with the beater blades. The vines which thus escape the impact with the beater blades will lodge in the lower portion of the cylinder and will not be fed forward. If the vines do engage with the beater blades, they will engage with a blade at the time when it is extending horizontally toward the rear of the machine, and as a consequence the vines will be thrown upward instead of toward the front of the machine and will simply contact with the upper portion of the cylinder and drop back again. This continual dropping back of the vines tends to cause them to accumulate in the lower and rear portion of the cylinder until they become massed within the cylinder to such an extent as to cause the beater blades to crush the vines and the pea pods, thereby bruising the peas. This massing or collecting of the vines within the cylinder tends not only to injure the product, but also acts to prevent a rapid feed of material and the interior of the cylinder is liable to become clogged with the vines for the reason that it can not discharge as fast as the pea vines are fed into the cylinder.

The constant feeding of material into the cylinder soon fills up the spaces between the ties or ribs so that as the cylinders revolve, the peas, or rather the pea vines, roll back or fall out and in so doing come in contact with the beater boards many times before they are driven farther into the machine. In the usual pea hulling machines having one cylinder and with the elevating ribs set radially and relatively far apart, this constant dragging and striking process tends to crush the peas instead of hulling them as there are too many vines at a given point to secure an impact, and what should be an impact becomes merely a crushing or dragging action. This destroys many of the peas and injures the quality of the remainder as they are bruised. By increasing the number of ties or ribs and setting the ties tangentially, the vines are gathered up oftener and in smaller quantities, thus preventing this crushing or dragging action and delivering the peas perfectly to the beater blades. It is also to be noted that I use a greater numbe of these ties or ribs than in the ordinary machine. The reason for this is that the smaller the bundles of vines which are delivered to the beater, the more rapid will be the feed through the machine, and the greater the number of times that the beaters will strike the bundle in passing through the cylinder.

The greater number of ties or elevating ribs in the larger cylinder prevents an accumulation of vines in the bottom or in any other part of the machine because the space between these ties or elevating ribs is not large enough to retain a great accumulation of vines and the ribs pass a common point oftener than they do in the ordinary cylinder, carrying only a small quantity of vines at a time and delivering them to the impact or beater blades, thus increasing the capacity of the machine. This feature is of particular importance in the process of hulling peas. Quality is the main desideratum in these machines but next after quality comes speed.

It is in the first or primary cylinder that the beating of the vines and opening of the pods is secured. Where only one cylinder is used, this breaking of the pods is to a large extent secured, but as before explained, the vines become matted or collected in the lower portion of the cylinder and the peas and pea pods are liable to become crushed and bruised. Furthermore, no means is provided for so disentangling and tearing apart the vines within the cylinder that the shelled peas held imprisoned therein may escape.

It will be noted that the primary cylinder in my invention is relatively small in diameter, and assuming the cylinder to be five feet in diameter, then the inner edges of the ties or ribs are within about six inches of the beater blades 20. This is necessary in order to secure the delivery of such a blow or impact as will break the pods and release the peas. If the cylinders were made larger, it would not secure this pod breaking action and therefore the vines would pass through the cylinder with only part of the pods completely broken. If the cylinder, on the other hand, is small in diameter, as is my primary cylinder, the action will be to break the pods but it will not act to disentangle and separate the vines to an extent which will permit the imprisoned peas to be discharged.

In the pea-hulling machines now upon the market, from eight to ten per cent. of fine peas are lost by being carried out of the machine with the vines. It has been attempted to save these peas by the use of additional separating apparatus, but even though a portion of the peas may be recovered, yet the peas are recovered together with trash and dirt, and these recovered peas together with the trash and dirt have to be passed again through the machine along with the pea vines. In order to avoid this, I have provided the secondary cylinder before referred to into which the vines are carried after they have passed through the primary cylinder and whereby the masses of vines are disentangled and opened up so that the peas imprisoned in the vines may escape and be discharged through the perforations in the periphery of the cylinder. This secondary cylinder as will be seen from Fig. 4, is considerably larger than the primary cylinder. As a matter of fact the working diameter of the primary cylinder would be about five feet and of the secondary cylinder about eight feet. Attached to the primary cylinder and extending into the secondary cylinder is the annular chute 31. This chute is flared outward and toward the secondary cylinder. When a mass of pea vines is thrown by the beaters 20 onto this chute, it will strike against the side of the chute 31 and then will slip through this chute to the lowest portion thereof, sliding downward on an incline and dropping onto the ties or ribs of the secondary cylinder. There is therefore considerable travel for the pea vines from the time that they strike the chute 31 until they drop into the secondary cylinder, and this travel of the pea vines will tend to separate them and to change the relative position of the vines so that the peas imprisoned therein will escape. These peas will naturally roll to the lowest portion of the chute and from there drop into the lowest portion of the secondary cylinder. When the vines leave the chute 31 they tend to drop to the lowest portion of the secondary cylinder—a drop of some eighteen inches—and this will further tend to open up the vines and permit the escape of the peas imprisoned therein. The action of this secondary cylinder on the vines contained therein is somewhat different from the action of the primary cylinder. As before stated, the primary cylinder is intended for the purpose of delivering a succession of blows upon the bundles of pea vines so as to break the pods and permit the escape of the peas. Practically all of the pods will be broken in the primary cylinder, but the entangled vines with peas imprisoned therein will be carried, as before remarked, into the secondary cylinder. In this cylinder, as will be noted, the ribs or ties are set tangentially to the center of rotation so that the bundles of peas will be carried up to a point almost immediately above the beaters before being dropped onto the beaters. They will therefore be dropped onto these beaters from a relatively long distance, and when struck by the beaters they will be flung across the cylinder toward the forward portion thereof, and this travel of the vines through the air—a distance nearly equal to the radius of the cylinder—will permit the loose peas to fall out of the vines and fall to the bottom of the cylinder where they will pass out through the perforations.

It is to be particularly noted that the blades 20 on that portion of the beater which is disposed within the secondary cylinder are relatively short. They are only about one-half the length of the beater blades in the primary cylinder and may be shorter, and this difference in the length of the beater blades is very important. Only a portion of any one mass of vines will be struck by the relatively short blade and as a consequence the vines will be twisted in their movement and this twisting action will tend to separate the vines. The next adjacent relatively short beater blade will engage another portion of this same bundle of vines and give it a different impact or a later impact so that the different portions of the bundle of vines will have different velocities or will move in somewhat different directions, and this again will tend to tear the vines apart or separate them. If the bundle or bunch were thrown as a whole across the machine, with all the parts moving at the same speed and no part lagging behind the rest, the bunches would not become so separated as would permit all of the peas to drop, but it is by the impact of these relatively small blades on a portion of the bunch that the maximum separating result is secured.

It is also to be pointed out that because of the relatively large size of the secondary cylinder, I can and do provide a greater number of ribs or ties 29 than is possible where the cylinder is small. As a consequence, the bundles or bunches operated upon are smaller in size and thus a better separation of the component parts of the bundle is secured and a faster feed out of the machine. It is also to be noted that the secondary cylinder is driven at a higher speed than the primary cylinder so that the vines will be thrown with sufficient force from the beater as to traverse the space between the beater and the front portion of the secondary cylinder without dropping downward. It is again reiterated that it is this throwing of the vines through the air a distance of at least three feet that accomplishes this separation of the vines and the disentanglement of the imprisoned peas.

While, of course, the two cylinders and the central drum may be run at any desired speed, preferably the beater drum revolves at a speed of 170 to 225 revolutions per minute, while the cylinders revolve from 20 to 30 revolutions in the same time, both of the cylinders turning in the same direction, but the primary cylinder running at a slower speed than the secondary cylinder. The shaft or cylinder to which the beater or impact boards are attached passes a given point on the outside cylinders from six to nine times while they are making a revolution.

Attention is particularly directed to the sanitary feature of the roof or housing. In all pea vine-hulling machines known to me, the housing is horizontal on top and vertical at the front and rear or sides of the compartment within which the cylinder is housed. The corners so formed will collect trash, dirt, peas and portions of the vines to such an extent as to completely coat the roof and front wall of the housing. If this front wall and the roof of the housing is not cleaned, this layer of matter within twenty-four to thirty hours will become not only a hot bed of germs but will become filled with maggots. By providing the arched roof before described extending down to the openings into the lower portion of the cylinder compartment, I provide a surface which will not retain these bits of vegetable matter, dirt, trash, etc., and which may be readily cleansed. In this curved housing there are no sharp corners or recesses which can possibly retain dirt and germs, whereas in the prior constructions known to me, it is impossible to properly clean these surfaces.

There is another very important reason for providing a housing or roof which will not retain the bits of vegetable matter, pea vines, leaves, trash, etc. Where this vegetable matter or trash is wet as is often the case, a pea thrown from the cylinder by centrifugal action is liable to stick against this wet and relatively soft surface, and this pea may remain in this position possibly throughout the greater portion of the day. If the day is warm and sultry, this pea is very liable to become sour. It may eventually drop from its location and be passed out with the other peas but this pea, if it eventually passes to the can as it will do, will spoil the contents of this can. By providing no niches, notches, recesses or corners which will retain this accumulation of dirt and vegetable matter, it is impossible for a pea to secure a lodgment against the roof, and hence the product itself will be entirely sanitary and in first-class fresh condition for canning.

Of course, I am not to be limited to the details of construction illustrated as various changes might be made therein without departing from the spirit of the invention, but I have found this embodiment of the invention entirely effective in practice and that it does the work in an extremely thorough manner.

Having thus described the invention, what is claimed as new is:—

1. A green pea vine hulling machine including a plurality of rotatable cylinders disposed in alinement with each other through which the vines successively pass longitudinally, each cylinder having a perforated covering and elevating ribs, a beater carrying drum extending through both cylinders, and beater blades thereon extending outwardly a relatively short distance, said blades being arranged diagonally to the longitudinal axis of the drum and there being a clear free space between the circle defined by the blades and the circle defined by the ribs.

2. A green pea vine hulling machine including a plurality of rotatable cylinders through which the vines successively pass, each cylinder having a perforated covering and elevating ribs, a revolving beater extending through both cylinders, means for rotating the beater, and means for rotating both of said cylinders at different speeds with relation to each other and with relation to the beater.

3. A green pea vine hulling machine including a rotating primary cylinder, a rotating secondary cylinder, the secondary cylinder being larger in diameter than the primary cylinder and each cylinder having a perforated covering and elevating ribs, and a revolving beater extending through both said cylinders, there being a clear space about the beater in each cylinder which space is larger in the secondary cylinder than in the primary cylinder.

4. A green pea vine hulling machine including a rotating primary and a rotating secondary cylinder through which the vines successively pass, the secondary cylinder being larger in diameter than the primary cylinder, each of said cylinders having a perforated covering and elevating ribs, an annular chute attached to one of said cylinders and entering the other of said cylinders, and a beater carrying drum extending through both cylinders.

5. A green pea vine hulling machine including a pair of annular cylinders both of said cylinders being rotatable, and each having a perforated covering and elevating ribs, an annular chute attached to one of said cylinders and extending into the other of said cylinders, and an annular discharge chute extending from the discharge end of the last-named cylinder.

6. A green pea vine hulling machine including a supporting frame, a primary and a secondary cylinder both being rotatably mounted in said frame, the secondary cylinder being larger than the primary cylinder, each of said cylinders having a perforated covering and elevating ribs, an annular chute attached to the primary cylinder and rotatable therewith and extending into the secondary cylinder, the discharge end of the secondary cylinder being formed with an opening, and a discharge chute attached to the frame of the machine and extending into the discharge opening of the secondary cylinder.

7. A green pea vine hulling machine including a plurality of connected cylinders, each cylinder having a perforated covering and elevating ribs, a beater extending through the cylinders and having helically disposed impact blades, and means for rotating the cylinders at different speeds relative to each other and relative to the beater.

8. A green pea vine hulling machine including a supporting frame, a primary and secondary cylinder, each rotatably mounted upon the frame and spaced from each other by transversely extending spaced partitions, each cylinder having a perforated covering and a plurality of elevating ribs, means for rotating the primary cylinder at a different speed from the secondary cylinder, an annular discharge chute attached to the primary cylinder and extending into the secondary cylinder and through said intermediate partitions, a fixed discharge chute disposed at the discharge end of the secondary cylinder and extending from the same, a beater having helically arranged blades passing through both of said cylinders, and means for rotating the beater at a different speed from either of the cylinders.

9. A green pea vine hulling machine including a rotatable primary cylinder and a rotatable secondary cylinder, the secondary cylinder being larger in diameter than the primary cylinder but having a less width, each of said cylinders having a perforated covering and elevating ribs, a beater carrying drum extending through both of said cylinders and provided with beaters within both cylinders, the beaters in the secondary cylinder being smaller than those in the primary cylinder, and means for rotating said cylinders and the drum at relatively different speeds.

10. A green pea vine hulling machine including a rotatable primary cylinder, a rotatable secondary cylinder, the primary cylinder having a diameter less than that of the secondary cylinder, both of said cylinders including annular end wheels connected by tangentially disposed elevating ribs and an outer perforated covering, a funnel-shaped annular chute attached to and rotating with the primary cylinder and extending into the secondary cylinder, said chute flaring outward from the primary to the secondary cylinder, a discharge chute attached to the discharge end of the secondary cylinder, and a beater drum having helically arranged beating blades and extending longitudinally through both of said cylinders.

11. In a green pea vine hulling machine, a supporting frame, a cylinder located therein, an arcuate roof detachably secured upon said frame and arching over the cylinder, and a casing member attached to the frame and incasing said roof and said cylinder.

In testimony whereof, I affix my signature.

JAMES G. COIL. [L. S.]